(12) United States Patent
Paterson et al.

(10) Patent No.: US 7,503,345 B2
(45) Date of Patent: Mar. 17, 2009

(54) FLOW CONTROL APPARATUS

(75) Inventors: Graham H. Paterson, Wilmington, DE (US); Frederick M. Kappel, Wilmington, DE (US)

(73) Assignee: Speakman Company, New Castle, DE (US)

( * ) Notice: Subject to any disclaimer, the term of this patent is extended or adjusted under 35 U.S.C. 154(b) by 268 days.

(21) Appl. No.: 11/506,121

(22) Filed: Aug. 17, 2006

(65) Prior Publication Data

US 2008/0041471 A1    Feb. 21, 2008

(51) Int. Cl.
*F16K 11/08* (2006.01)
*E03C 1/02* (2006.01)

(52) U.S. Cl. .................. 137/625.47; 4/615; 4/596; 239/446; 239/581.1; 251/207

(58) Field of Classification Search ............ 137/625.19, 137/625.47; 4/596, 597, 605, 615, 675; 239/396, 239/416.2, 443, 444, 445, 446, 581.1; 138/37; 251/118, 207

See application file for complete search history.

(56) References Cited

U.S. PATENT DOCUMENTS

| | | | | |
|---|---|---|---|---|
| 2,621,012 | A | * | 12/1952 | Graham ................ 251/207 |
| 2,965,313 | A | * | 12/1960 | Jay ..................... 251/207 |
| 3,134,405 | A | * | 5/1964 | White et al. ............. 251/207 |
| 3,547,353 | A | | 12/1970 | Northfield |
| 4,130,128 | A | * | 12/1978 | Kaneko ................. 251/207 |
| 4,191,332 | A | | 3/1980 | De Langis et al. |
| 4,273,289 | A | | 6/1981 | Jette |
| 4,282,899 | A | * | 8/1981 | Dunckhorst ............... 4/605 |
| 4,311,279 | A | | 1/1982 | Jette |
| 4,360,160 | A | | 11/1982 | Jette |
| 4,391,265 | A | * | 7/1983 | Chen ................... 251/207 |
| 4,394,969 | A | | 7/1983 | Jette |
| 4,398,668 | A | | 8/1983 | Jette |
| 4,484,711 | A | | 11/1984 | Constantinescu et al. |
| 4,522,232 | A | * | 6/1985 | Ferguson ............. 137/625.32 |
| D287,995 | S | | 1/1987 | Ferguson |
| 4,655,078 | A | * | 4/1987 | Johnson ................ 251/207 |
| 5,123,628 | A | | 6/1992 | Yu |
| 5,143,300 | A | | 9/1992 | Cutler |
| 5,152,465 | A | | 10/1992 | Calabro |
| 5,188,335 | A | | 2/1993 | Pettinaroli et al. |

(Continued)

OTHER PUBLICATIONS www.niagraconservation.com.

*Primary Examiner*—John Fox
(74) *Attorney, Agent, or Firm*—Connolly Bove Lodge & Hutz LLP; Paul E. Crawford

(57) ABSTRACT

The invention is a flow controller attachable to a water supply. The controller has a body with inlet and outlet connections and a control element positioned between the inlet and outlet. The controller has an actuator extending from the control element that permits selection of three different settings. The first setting aligns a set of openings in the control element with the inlet and outlet of the body permitting unimpeded full flow of water. A second setting aligns another set of openings, which form a weep hole, in the control element to substantially impede flow from the inlet to the outlet. A third setting aligns a third set of openings in the control element with a flow control device, to partially impede flow from the inlet to the outlet, creating a low flow.

7 Claims, 4 Drawing Sheets

U.S. PATENT DOCUMENTS

| | | |
|---|---|---|
| 5,361,804 A | 11/1994 | Keller et al. |
| 5,533,549 A | 7/1996 | Sherman |
| 5,577,664 A * | 11/1996 | Heitzman .................... 239/99 |
| 5,740,836 A | 4/1998 | Tang et al. |
| 5,918,811 A | 7/1999 | Denham et al. |
| 6,126,091 A * | 10/2000 | Heitzman .................... 239/380 |
| 6,343,750 B1 | 2/2002 | Engel |
| 6,474,621 B1 | 11/2002 | Vogel et al. |
| 6,527,204 B2 * | 3/2003 | Heitzman .................... 239/569 |
| 6,550,697 B2 * | 4/2003 | Lai ............................ 239/446 |
| 6,565,018 B1 | 5/2003 | Degeyter |
| 7,363,680 B2 * | 4/2008 | Legatt ........................ 251/207 |

* cited by examiner

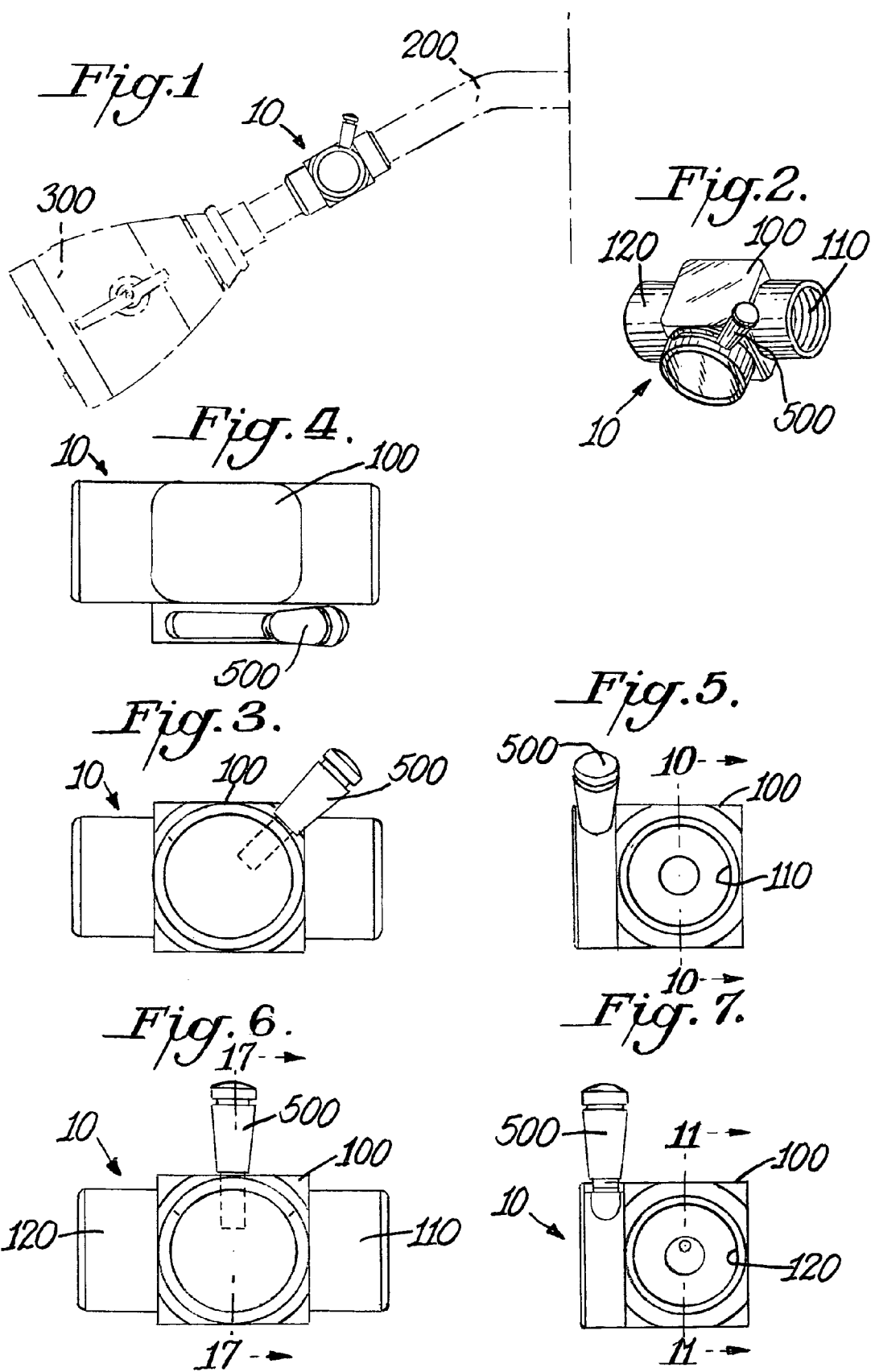

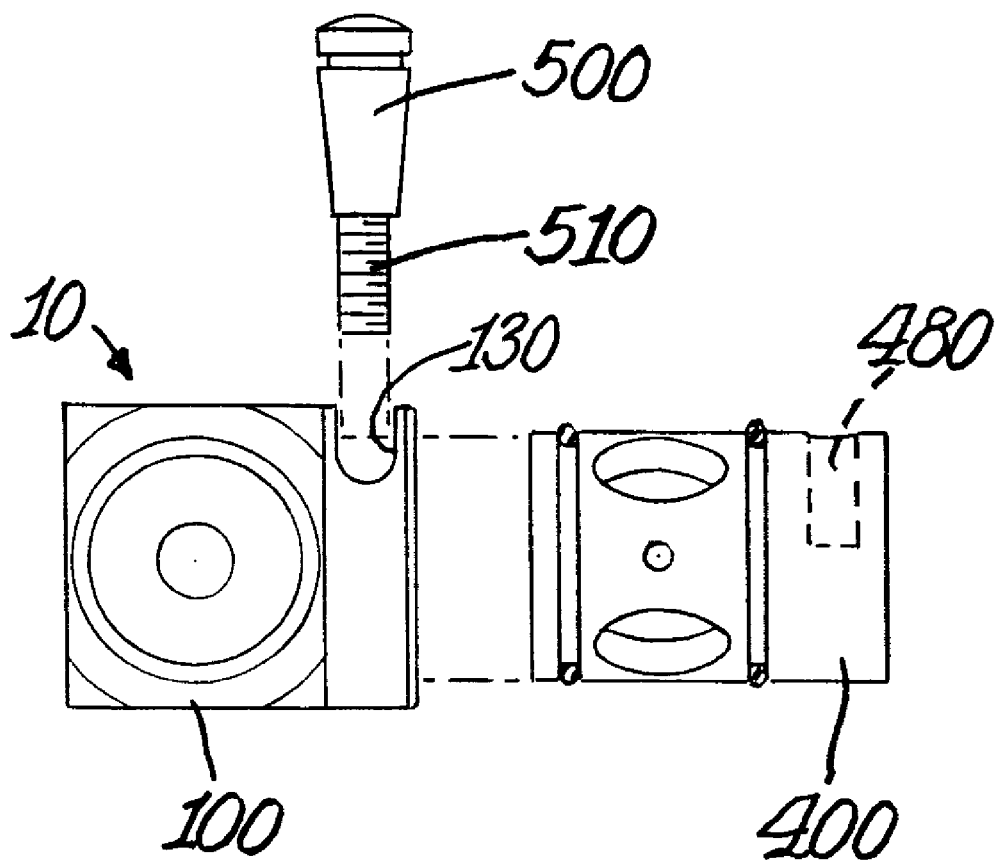

FLOW CONTROL APPARATUS

FIELD OF THE INVENTION

This invention relates to an arrangement for selectively controlling fluid flow. More particularly, but not exclusively, the invention relates to the regulation of water flow for shower bath units.

BACKGROUND OF THE INVENTION

The use of a water flow control device for a shower is known in the prior art. Known prior art includes U.S. Pat. No. 6,474,621; U.S. Pat. No. 5,152,465; U.S. Pat. No. 5,123,628; U.S. Pat. No. 4,484,711; U.S. Pat. No. 4,398,668; U.S. Pat. No. 4,394,969; U.S. Pat. No. 4,273,289; U.S. Pat. No. 4,191,332; U.S. Pat. No. 3,547,353; and U.S. Pat. No. Des. 287,995. A myriad of regulations exist to conserve water by requiring devices to minimize consumption. Many of these water conservation devices focus of reducing the flow of water, i.e. low flow. The use of showers in personal hygiene is widespread in the United States and a pleasure to most users. Thus, showers provide a major opportunity in water conservation.

In a shower, the water is normally continuously running and results in excess consumption. Low-flow showerheads are well known. However, some users find these low-flow showerheads undesirable for many purposes, such as washing the hair, because of inadequate flow. During the shower there are many times when water flow is not needed and/or the user would be indifferent to a low flow. Standard flow arrangements could be used and, to achieve conservation, the user can rely upon manual adjustment of the main hot and cold shower water rate valves. This requires multiple adjustments that would be equally troublesome to the user.

Furthermore, many people prefer not to shut off the water supply for a number of reasons. First, they prefer to have a small quantity of water flowing from the showerhead while soap, shampoo and conditioner is applied to their body and hair, so as to keep the body and hair wet. Maintaining the body and hair wet makes it easier and more comfortable to apply the soap, shampoo and conditioner. Second, if the water supply is shut off and turned on again after soaping, shampooing, or conditioning, the water temperature will probably be different and the water temperature must be readjusted, causing the person great inconvenience. Accordingly, many people merely twist the showerhead to one side, thereby allowing water to flow continuously and causing water to be needlessly drained.

Therefore what is needed is a shower control system which minimizes shower water flow when full flow is not needed and permits the user to have full flow when desired. Furthermore what is needed is a shower control system that permits adjustments in water flow in a quick and easy manner that would not cause significant temperature fluctuations. Finally, what is needed is a shower control system that facilitates all these needs and which is also simple in construction to facilitate easy installation and low cost manufacturing.

BRIEF SUMMARY OF THE INVENTION

The invention is a flow controller attachable to a water supply. The controller has a body with inlet and outlet connections and a control element positioned between the inlet and outlet. The controller has an actuator extending from the control element that permits selection of three different settings. The first setting aligns a set of openings in the control element with the inlet and outlet of the body permitting unimpeded full flow of water. A second setting aligns another set of openings, which form a weep hole, in the control element to substantially impede flow from the inlet to the outlet. A third setting aligns a third set of openings in the control element with a flow control device, to partially impede flow from the inlet to the outlet. The third setting's flow restriction creates a "low flow".

An object of the invention is to promote the conservation of water during a shower by permitting a user to adjust the water flow to a low or no flow setting at times during a shower when a full flow is not needed.

Another object of the invention is to permit the user to adjust the water flow to a full flow setting at times during a shower when a user would prefer full flow, e.g. hair washing.

Another object of the invention is to give the user the ability to quickly and easily adjust water flow during the shower.

The features of the present invention are set forth below in the claims. Further objects of the present invention are best understood and appreciated by reference to the following description and drawings taken in conjunction with the claims set forth below.

BRIEF DESCRIPTION OF THE DRAWINGS

FIG. 1 illustrates a flow controller in accordance with the disclosure as installed between the water supply line and a shower head;

FIG. 2 is a perspective view of a flow controller in accordance with the disclosure;

FIG. 3 is a side elevational view of a flow controller in a full flow setting in accordance with the disclosure;

FIG. 4 is a top plan view of a flow controller in a full flow setting in accordance with the disclosure;

FIG. 5 is a front elevational view of a flow controller in a full flow setting in accordance with the disclosure;

FIG. 6 is a side elevational view of a flow controller in a no flow setting in accordance with the disclosure;

FIG. 7 is a front elevational view of a flow controller in a no flow setting in accordance with the disclosure;

FIG. 19 is an exploded view a flow controller in accordance with the disclosure.

DETAILED DESCRIPTION OF THE INVENTION

Figure 8:
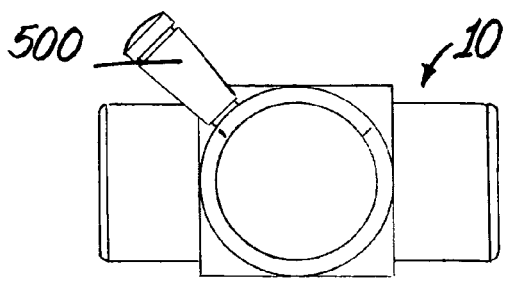
FIG. 8 is a side elevational view of a flow controller in a low flow setting in accordance with the disclosure.

The embodiments of the present invention will now be discussed. The particulars shown herein are by way of example and for illustrative discussion of the embodiments of the present invention. The embodiments are presented in the interest of providing what is considered to be a useful and readily understood description of the principles and conceptual aspects of the present invention. In this regard, a person of ordinary skill in the relevant art would recognize that other steps, configurations, arrangements or devices may be used to achieve the features of the invention without departing from the inventive concept and scope of the present invention. The description is presented, with the drawings, to only make apparent to those of ordinary skill in the art how some of the forms of the present invention may be embodied in practice.

The flow controller of this invention is generally indicated at 10 in the figures. FIG. 1 illustrates flow controller 10 in one of its intended use environments interconnecting water supply 200 with nozzle 300. FIG. 2 illustrates flow controller 10 in a three dimensional perspective. Flow controller 10 has a body 100, an inlet connection 110, an outlet connection 120 and actuator 500. The connections are threaded but any known pipe interconnection design will suffice, e.g. friction fit, weld etc. Flow controller 10 is preferably formed from a non-corrosive metal or metal alloy, e.g. copper or brass, but may be made out of any suitable material for the handling of fluids.

Figure 18:
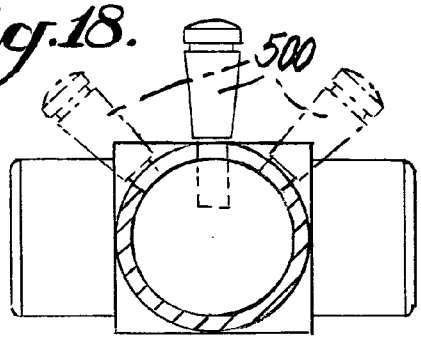
FIG. 18 is a cross sectional view of the three flow setting positions for the actuator.

The option for full flow makes available better flow when needed, e.g. during hair shampooing and rinsing. The option to suspend flow will permit maximum water savings when flow is not needed, e.g. lathering. Finally flow controller 10 permits a user to quickly and easily alternate between these flows with lever actuator 500 even though the user's hands may be wet and soapy. FIG. 18 illustrates flow controller 10 with the three different possible setting for flow depending upon the position of actuator 500.

Figure 10:
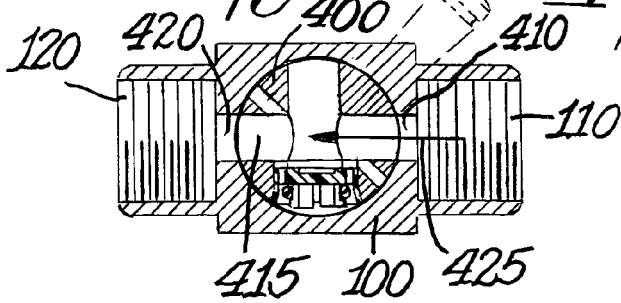
FIG. 10 is a cross sectional view in elevation taken along line 10-10 of FIG. 5 of a flow controller in a full flow setting in accordance with the disclosure.
Figure 17:
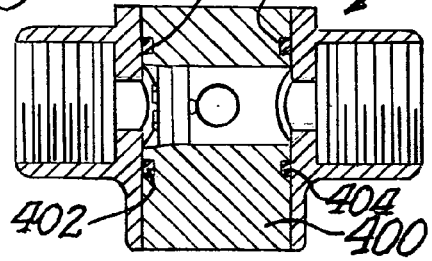
FIG. 17 is a cross sectional view in elevation view taken along line 17-17 of FIG. 6 of a flow controller in a low flow setting in accordance with the disclosure

FIG. 3 illustrates flow controller 10 on a longitudinal side of body 100 with actuator 500 in a full flow setting. FIG. 4 illustrates a top view of the flow controller 10 with actuator 500 in a full flow setting. FIG. 5 illustrates flow controller 10 from the distal end of body 100 where water supply 200 connects to inlet connector 110. Flow controller 10 is in a full flow setting. Line 10-10 shows control element 500 positioned so that opening 410 and opening 420 form flow channel 415 (See FIG. 10). Flow channel 415 is preferably parallel to the length of body 100 from inlet connector 110 to outlet connector 120 in FIG. 10. Arrow 425 indicates the flow path of water in the full flow setting through flow controller 10.

Figure 11:
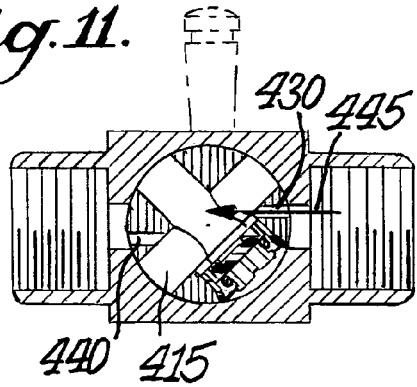
FIG. 11 is a cross sectional view in elevation taken along line 11-11 of FIG. 7 of a flow controller in a no flow setting in accordance with the disclosure.

FIG. 6 illustrates flow controller 10 on a longitudinal side of body 100 with actuator 500 in a no flow setting. FIG. 7 illustrates flow controller 10 from the distal end of body 100 where water supply 200 connects to inlet connector 110. Flow controller 10 is in a no flow setting. Line 11-11 shows control element 400 positioned so that opening 430 and opening 440 permit only an offset weep flow into flow channel 415 which is canted to an approximate forty five degree angle relative to the length of body 100 from inlet connector 110 to outlet connector 120 in FIG 11. Arrow 445 indicates the flow path of water in the no flow setting through flow controller 10. Third opening 430 and fourth opening 440 create a weep hole which permits only a small dripping flow that mimics weeping.

Figure 9:
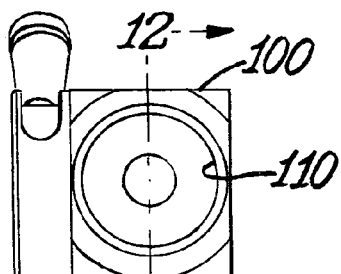
FIG. 9 is a front elevational view of a flow controller in a low flow setting in accordance with the disclosure.
Figure 12:
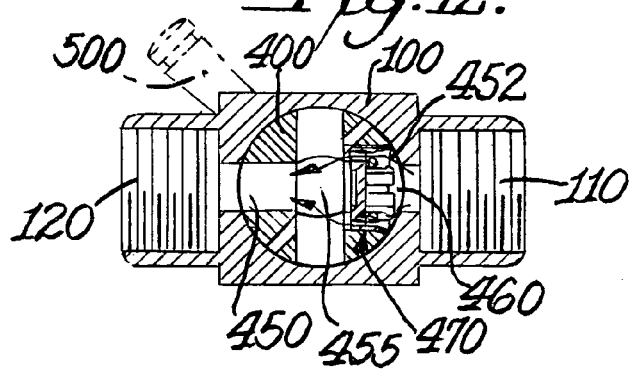
FIG. 12 is a cross sectional view in elevation taken along line 12-12 of FIG. 9 of a flow controller in a low flow setting in accordance with the disclosure.

FIG. 8 illustrates flow controller 10 on a longitudinal side of body 100 with actuator 500 in a low flow setting. FIG. 9 illustrates flow controller 10 from the distal end of body 100 where water supply 200 connects to inlet connector 110. Flow controller 10 is in a low flow setting. Line 12-12 shows control element 400 positioned so that opening 450 and opening 460 permit a restricted or low flow into flow channel 455 (See FIG. 12). Flow channel 455 is parallel to the length of body 100 from inlet connector 110 to outlet connector 120 in FIG 12. Low flow is created by flow restrictor 470. Flow restrictor 470 is sized and shaped to fit into opening 460. The posterior rim of opening 460 has an annular or circumferential lip or ledge 462 (See FIG. 13). Lip 462 serves as a seat or stop for flow restrictor 470. Arrows 452 indicate the flow path of water in the low flow setting through flow controller 10.

Figure 13:
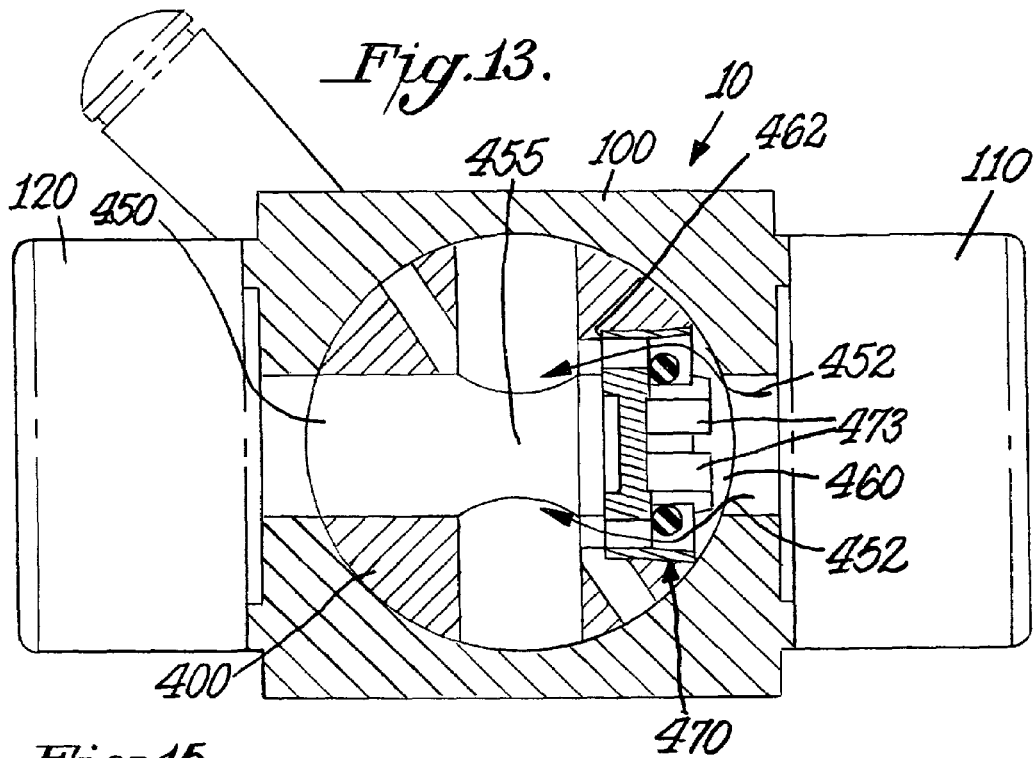
FIG. 13 is an enlarged partial cross sectional view of a flow controller in a low flow setting in accordance with the disclosure.

FIG. 13 illustrates a close up longitudinal sectional view of flow controller 10 in a low flow setting. Control element 400 is positioned so that opening 450 and 460 permit a restricted or low flow into flow channel 455. Flow channel 455 is parallel to the length of body 100 from inlet connector 110 to outlet connector 120. Low flow is created by flow restrictor 470.

Figure 15:
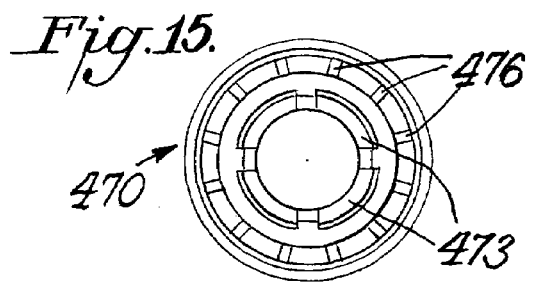
FIG. 15 is a front elevational view of a flow restrictor used for the low flow setting.
Figure 14:
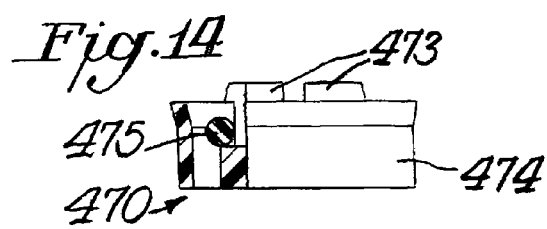
FIG. 14 is a partial cross sectional view of a flow restrictor used for the low flow setting.
Figure 16:
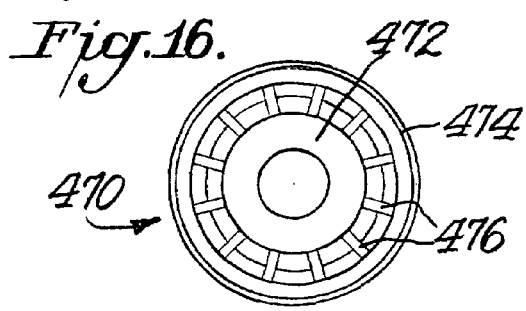
FIG. 16 is a rear elevational view of a flow restrictor used in the low flow setting.

Flow restrictor 470 is designed to reduce the area of opening 460. FIG. 16 is a rear view of a flow restrictor used in the low flow setting. Flow restrictor 470 has a central hub 472 and a circumferential skirt 474 interconnected by radial spokes 476. Radial spokes 476, central hub 472 and skirt 474 define an array of circumferential spaces 478 which facilitate low flow. FIG. 15 is a frontal view of flow restrictor 470 illustrating central hub 472, circumferential skirt 474 and radial spokes 476 from this perspective. Extending perpendicular from the front of central hub 472 is an array of o-ring clips 473. Clips 473 track a discontinuous parallel circumference relative to the circumference of central hub 472. Clips 473 serve to seat and secure o-ring 475. This arrangement is best illustrated in the cut out portion of the sectional side view of flow restrictor 470 in FIG. 14. Flow restrictor 470 is made of a plastic polymer, but can be made of any suitable material for the handling of fluids. O-ring 475 is made out of elastic rubber, but can be made out of any suitable elastomeric material for making o-ring gaskets. Any other form of flow restrictor may be used by simply adapting opening 460 to receive it.

FIG. 18 is cross sectional view of flow controller 10. Control element 400 is positioned to permit a restricted or low flow through the controller. O-rings 402 and 404 are placed above and below the fluid flow channels in control element 400 in O-ring tracks 403 and 405 respectively. The positioning of O-rings 402 and 404 serve as a seal that prevents fluid leakage at the interface between control element 400 and body 100.

FIG. 19 illustrates flow controller 10 disassembled and indicating the mechanical interrelationships of control element 400, actuator 500 and body 100. Control element 400 is designed to frictionally fit into body 100. Actuator 500 is designed with a threaded region 510 to thread into control element 400 at actuator well 480 via body actuator slot 130. While a threaded interconnection is illustrated, any known interconnection design with suffice, e.g. friction fit. This design allows for easy and inexpensive manufacture and assembly. Activator 500 can likewise be modified to satisfy particular uses of the controller 10 in particular applications.

While various embodiments of the present invention are presented above, it is noted that these foregoing examples are provided merely for purposes of explanation and are not for purposes of limitation. While the present invention may be described with reference to an exemplary embodiment, the language used to set forth the exemplary embodiment, are words of description and not words of limitation. Although the present invention is described with reference to particular means, materials and structures, the present invention is not intended to be limited to the particulars disclosed, rather the present invention extends to all present and later developed equivalents of those set forth herein as appreciated by one of ordinary skill in the relevant art.

What is claimed as new and desired to be protected by Letters Patent of the United States is:

1. A flow-controller for three-way adjustment of flow thru a showerhead comprising;
    a body with an inlet connection to a water supply and an outlet connection to a showerhead;
    a circumferential bore in the body in fluid contact with the water inlet and outlet connections;
    a control element in close mating, but rotatable, relationship with the bore in the body; sealing means between the control element and bore in the body wherein the control element includes multiple longitudinal passages therethrough comprising;
        a first passage having a diameter of sufficient size to permit substantially full flow of water reaching the inlet connection of the body to flow through the control element and reach the outlet connection,
        a second passage having a sufficiently narrow diameter to substantially restrict water flow thru the control element to a small dripping flow that mimics weeping,
        a third passage including a flexible flow restrictor therein, and
    a lever attached to the control element to rotate it within the body to respectively align one of the fist, second or third passages with the inlet and outlet connections of the body and thereby control flow through the body to one of three amounts according to the alignment of the particular passage.

2. The flow controller of claim 1 wherein the third passage includes a recessed seat to facilitate placement of the flexible flow restrictor therein.

3. The flow controller of claim 1 wherein the flow restrictor includes an O-ring therein to facilitate control of flow through the flow restrictor.

4. The flow controller of claim 1 wherein a bather can select any of the three passages to control or essentially stop the flow of water through the showerhead as needed during various stages of bathing.

5. The flow controller of claim 4 wherein the second passage is selected by a bather while lathering to save water.

6. The flow controller of claim 4 wherein the bather selects multiple passages in the flow controller while bathing.

7. The flow controller of claim 1 wherein a lever attached to the control element extends beyond the body to facilitate movement thereof by a bather.

* * * * *